Aug. 28, 1956 — A. PELTZER, SR — 2,760,889
STARCH MANUFACTURING PROCESS, INCLUDING
CENTRIFUGAL REMOVAL OF MIDDLINGS
Filed March 19, 1951 — 8 Sheets-Sheet 2
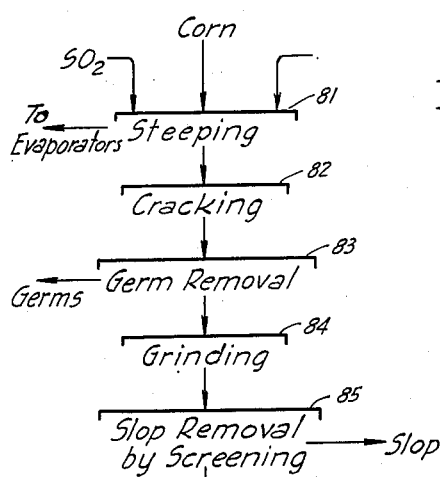
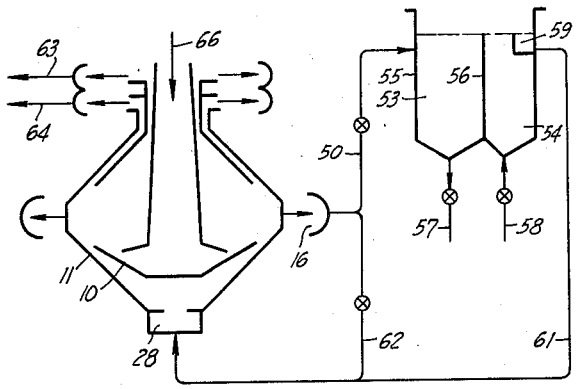
FIG_3_
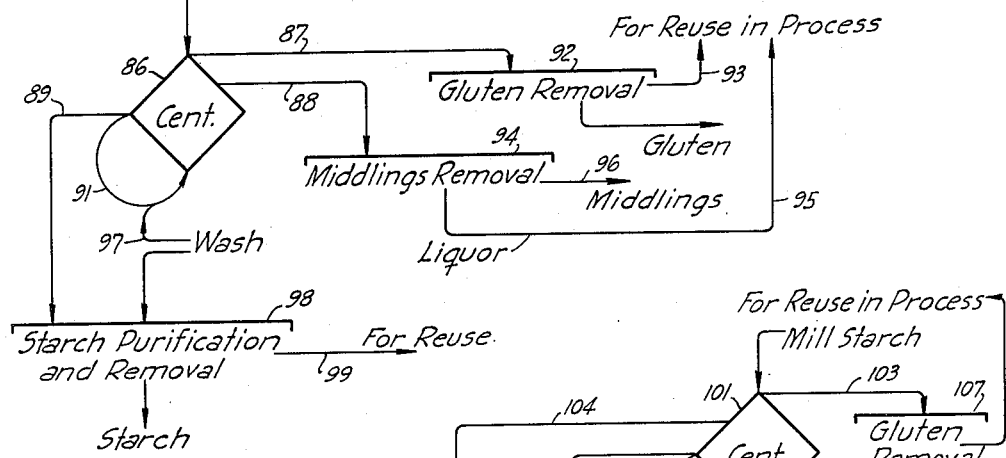
FIG_4_
FIG_5_
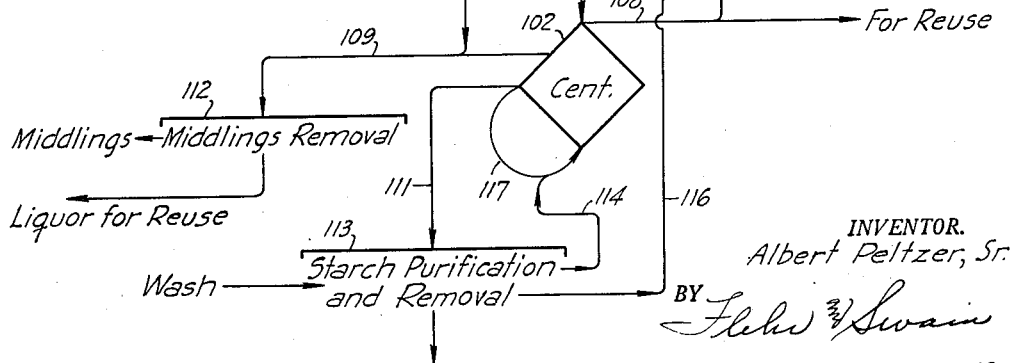
INVENTOR.
Albert Peltzer, Sr.
BY
ATTORNEYS

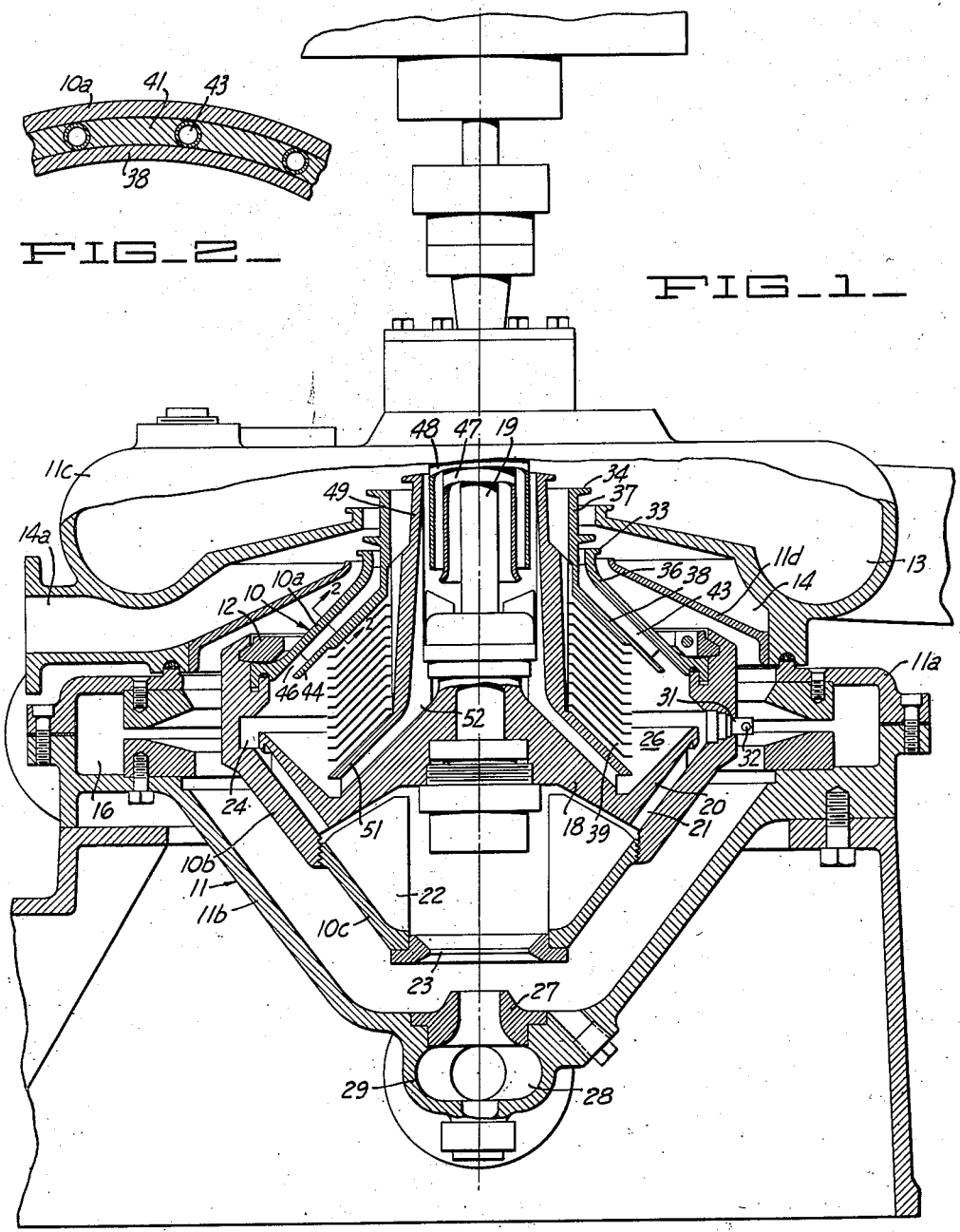

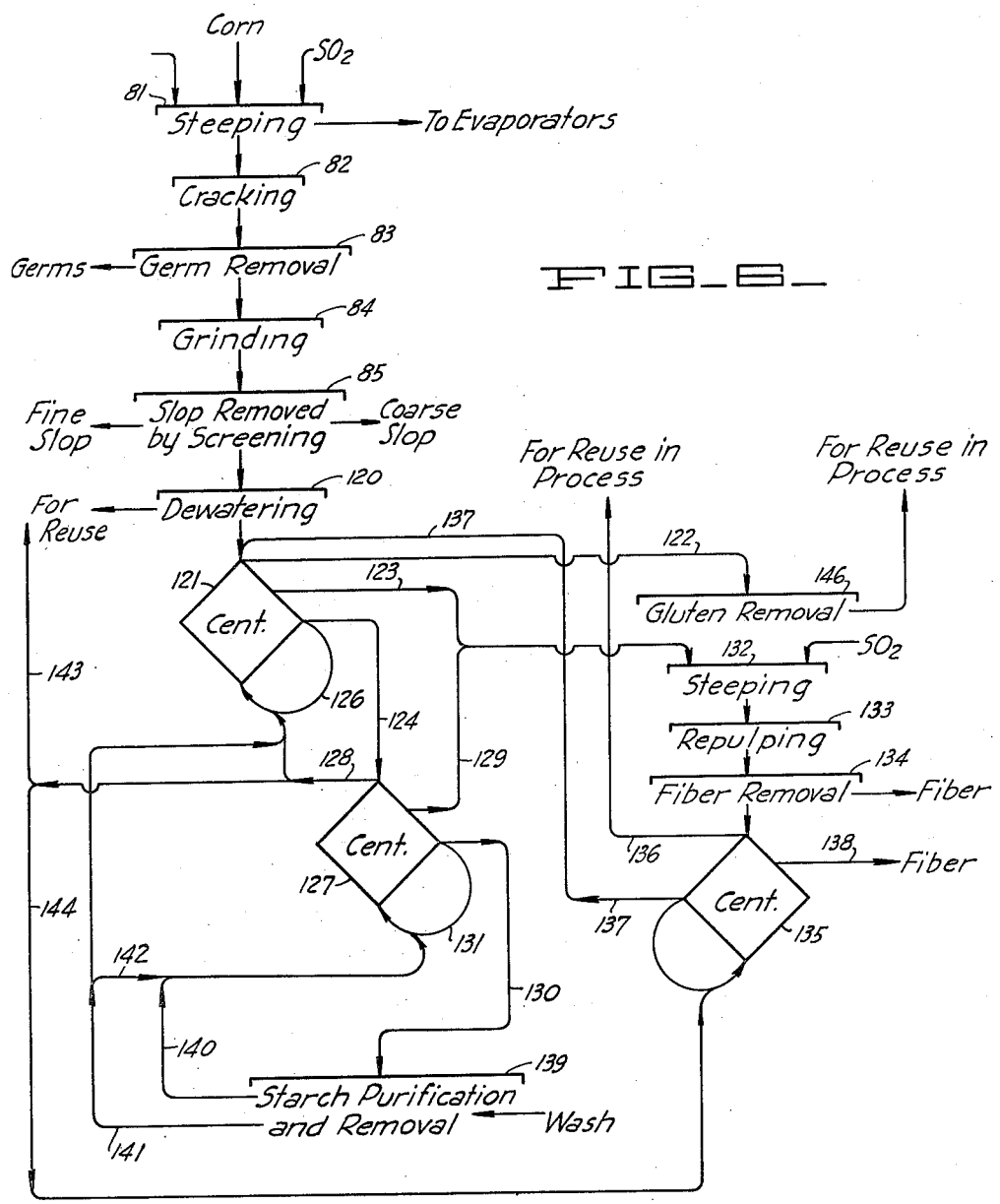

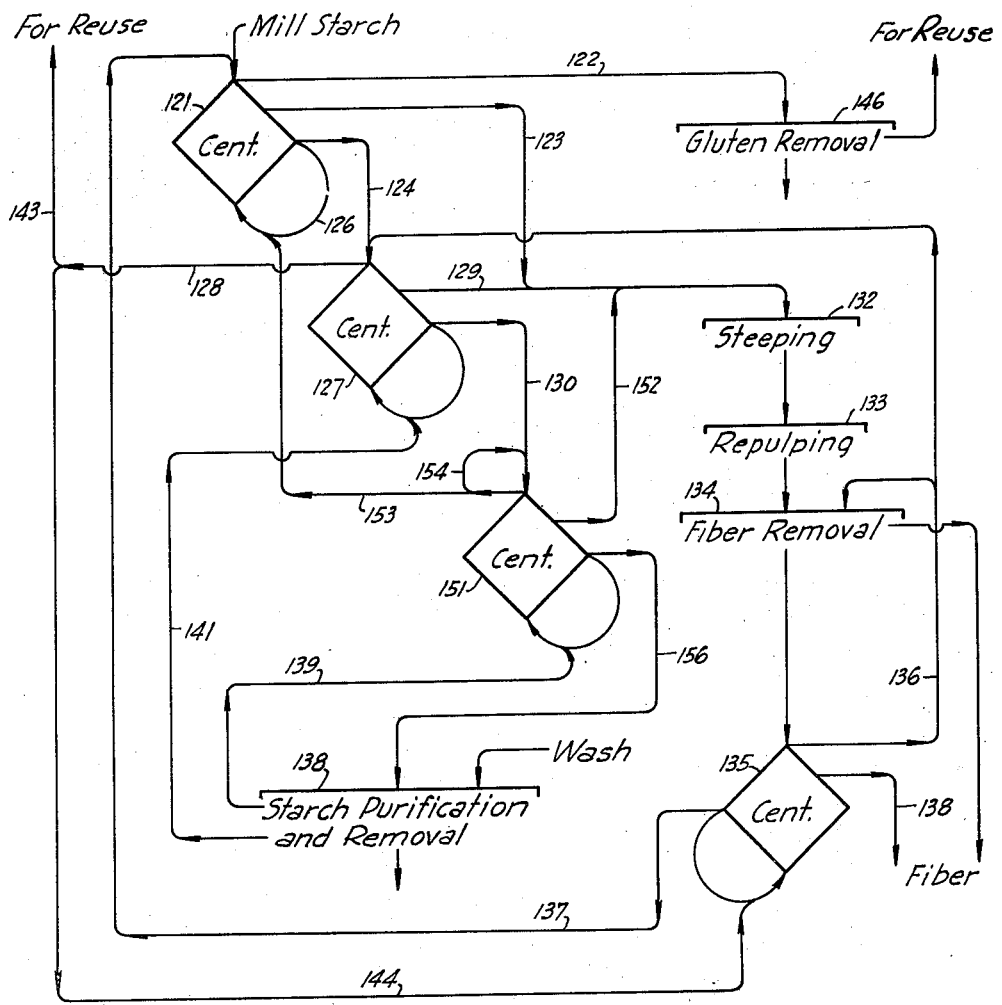
FIG_7_

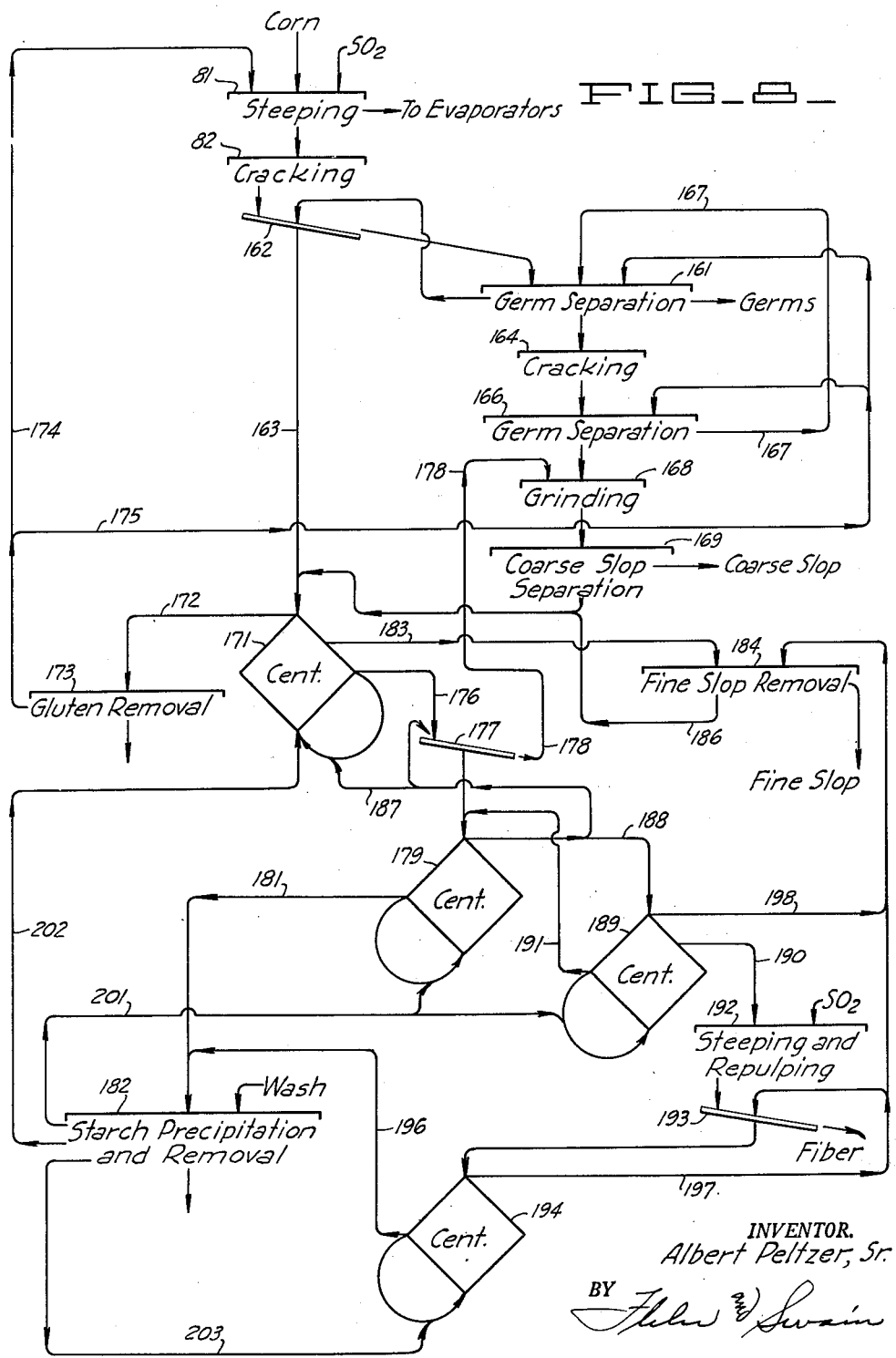

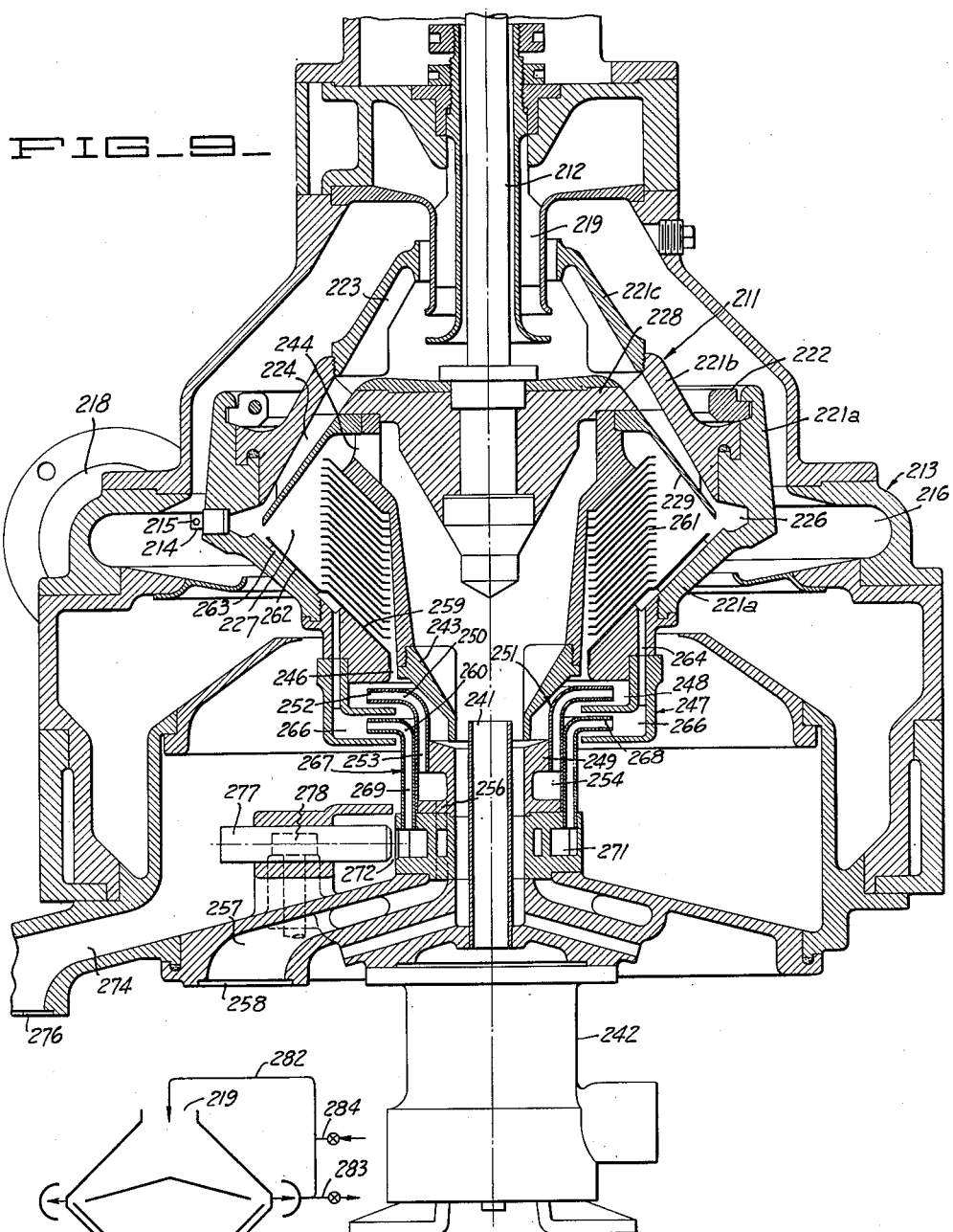
FIG_9_
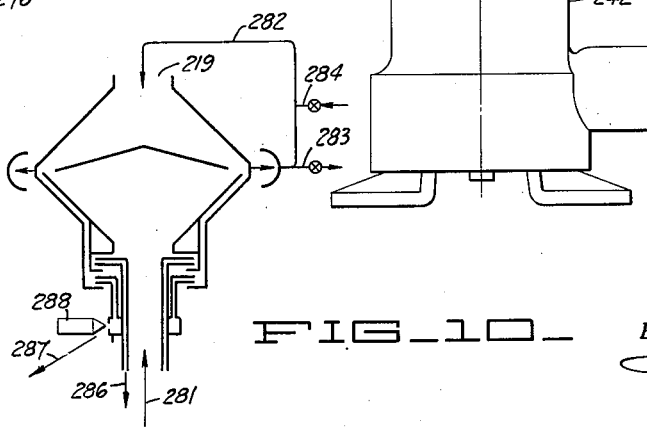
FIG_10_
INVENTOR.
Albert Peltzer, Jr.
ATTORNEYS

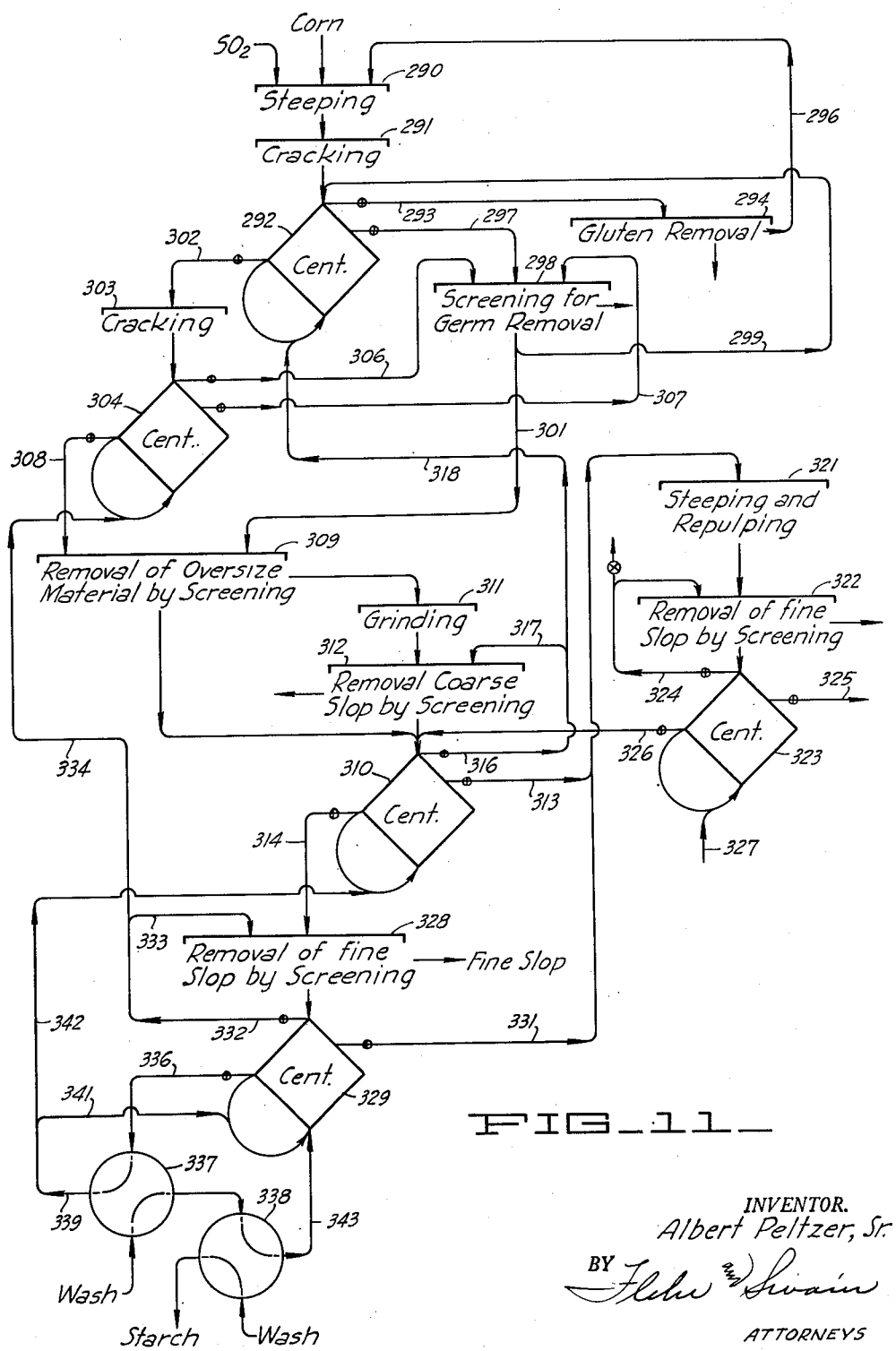

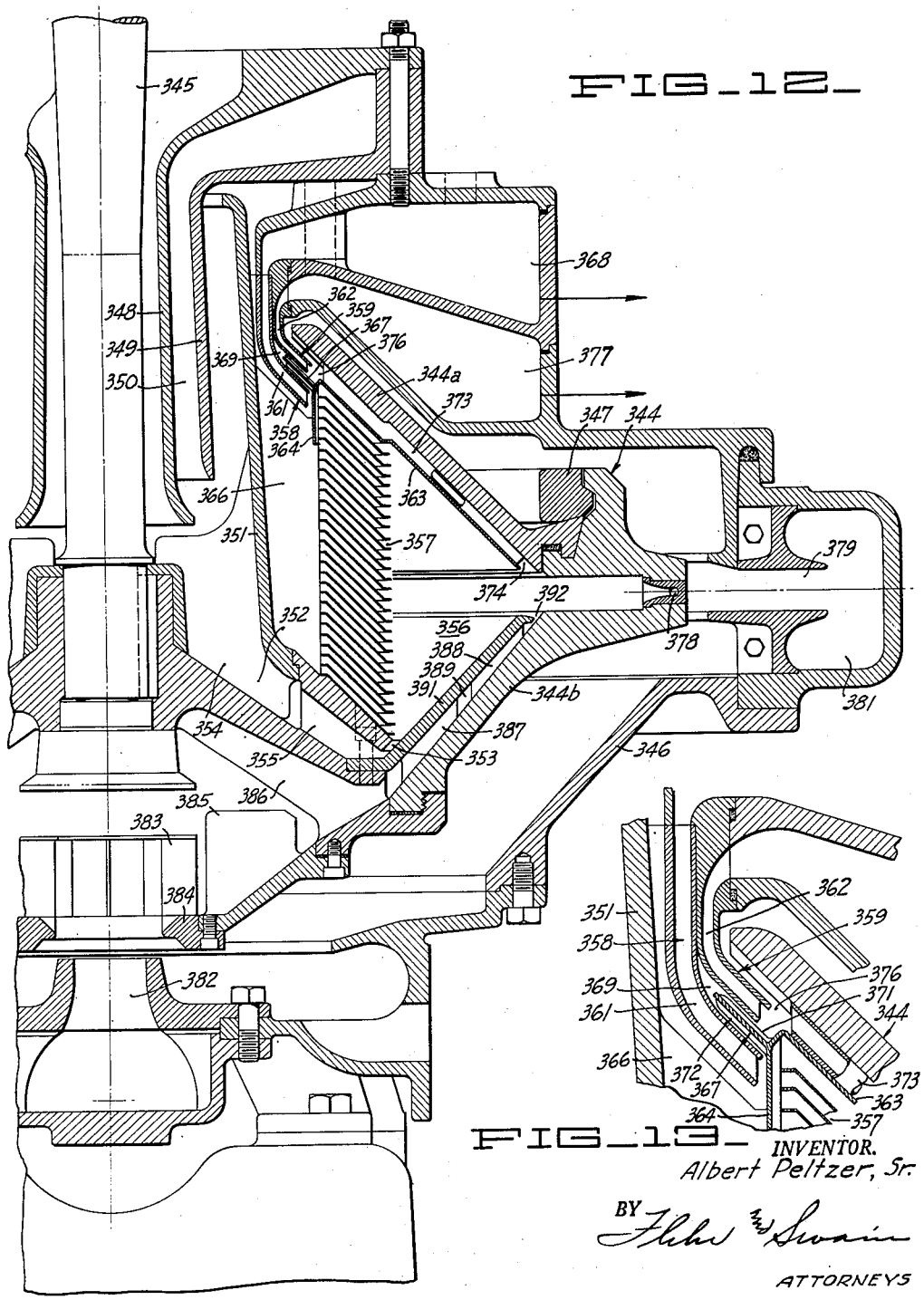

United States Patent Office 2,760,889
Patented Aug. 28, 1956

2,760,889

STARCH MANUFACTURING PROCESS, INCLUDING CENTRIFUGAL REMOVAL OF MIDDLINGS

Albert Peltzer, Sr., San Francisco, Calif., assignor, by mesne assignments, to Dorr-Oliver Incorporated, Stamford, Conn., a corporation of Delaware Application March 19, 1951, Serial No. 216,357

8 Claims. (Cl. 127—68)

This invention relates generally to processes for the commercial manufacture of starch from vegetable starch-bearing materials, and to centrifuges suitable for use in such processes.

Conventional methods for the manufacture of starch from vegetable starch-bearing materials employ wet starch methods. For example with grains like sorghum or Indian corn, the method involves steeping and cracking operations, followed by a series of wet milling and separating operations to produce a mill starch magma containing mainly finely divided starch, gluten and solubles. The wet milling operations as applied to grains ordinarily involve removal of germs after the steeped grain has been cracked, and elaborate screening operations for the removal of coarse and fine fibrous material referred to as "coarse slop" and "fine slop." The mill starch is commonly subjected to gravity tabling for separation of starch from gluten, and the separated starch then sent to starch filters for further purification and removal. A more modern method for the separation of starch is to employ one or more continuous centrifuges of the "Merco" type, which effectively separate starch from gluten and solubles.

Irrespective of whether or not the primary separating operation for the removal of starch from gluten is carried out by the older tabling method or by centrifuging, it has been recognized that certain solids of a fibrous nature are not removed from the starch and that they are detrimental to the finished starch or to other products made from the same. These solids appear to be fragments of what I have termed fibrous portions of the corn which are relatively finely divided, and are attached to or closely associated with starch particles. Such solids are difficult to remove in ordinary milling operations, including the screening employed in the fine and coarse slop systems. The industry has recognized the existence of this material in mill starch and the inherent difficulties involved in its presence, and in some instances it has been referred to in grain processing methods as "middlings." In addition to causing contamination of the recovered starch with fiber, where primary separation is carried out by centrifugal separation, a part of the middlings may be discharged with the gluten, thus not only complicating the problem of clarifying this material to provide process liquor for return to the system, but also lowering the protein content of the gluten recovered because of its inherent starch content. In fact if it is attempted to apply centrifugal separation to such gluten liquor to clarify the same, a very substantial part of middlings carried in this material are sent back into the wet starch process, with the result that troublesome middling fiber builds up in the system to a point which may require complete shutdown. Such build up of middlings tends to be particularly serious with certain kinds of grains.

It is a general object of the present invention to provide a wet starch manufacturing process which will effectively remove substantially all fibrous material, including middlings or their equivalents, thereby increasing the quality of the final starch product produced.

It is a further object of the invention to provide a process of the above character which will effectively remove middlings or their equivalents from starch bearing magma and recover the starch content associated with the same.

Another object of the invention is to provide a wet starch manufacturing process making use of a novel type of centrifugal separating operation whereby so-called middlings or like materials are effectively removed in a fraction separate from the starch and gluten fractions.

Another object of the invention is to provide a wet starch manufacturing process which will greatly simplify the operations required for the effective removal of fibrous material.

Another object of the invention is to provide a wet starch manufacturing process wherein centrifuging is employed for primary separation of starch, and in which the run-around for retreating the starch is greatly reduced over prior methods.

Another object of the invention is to provide a novel wet starch process in which the work of removing residual protein carrying matter from the starch fraction can be performed in a single centrifugal operation.

Another object of the invention is to provide a novel centrifuge suitable for use in the present process and constructed to enable withdrawal of a fraction containing middlings or like material, in addition to a starch underflow and a gluten overflow.

Additional objects of the invention will appear from the following description in which the preferred embodiments of the invention have been set forth in detail in conjunction with the accompanying drawing.

Referring to the drawing:

Figure 1 is a side elevational view in section illustrating a centrifuge suitable for use in my process.

Figure 2 is an enlarged cross-sectional detail taken along the line 2—2 of Figure 1.

Figure 3 is a schematic diagram illustrating connections between the centrifuge of Figure 1 and an external return circuit.

Figure 4 is a flow diagram illustrating one embodiment of my process.

Figure 5 is a diagram illustrating a modification of Figure 4.

Figure 6 is a flow diagram illustrating another embodiment of my process.

Figure 7 is a diagram illustrating a modification of Figure 6.

Figure 8 is a flow diagram illustrating another embodiment of the process.

Figure 9 is a side elevational view in section illustrating another embodiment of the machine illustrated in Figure 1.

Figure 10 is a diagram illustrating flow line connections to the machine of Figure 9.

Figure 11 illustrates another embodiment of my process in which centrifugal separation is utilized both in connection with germ and fiber separating operations.

Figure 12 is a cross-sectional detail illustrating another embodiment of a centrifuge suitable for use in my process and incorporating the present invention.

Figure 13 is an enlarged cross-sectional detail showing the means used in the machine of Figure 12 for discharging overflow and the second underflow.

The present invention involves the use of one or more special centrifugal separating operations which are applied in such a manner as to remove so-called middlings or the like from a starch bearing magma. The removed middlings are preferably treated for the recovery of the starch content thereof, with return of the recovered starch to the system.

My process involves the use of a special type of centrifuge which will not only effectively separate starch from gluten and solubles, but which in addition will provide a separate underflow drawoff for the removal of a centrifugally separated fraction containing the bulk of the middlings. I have found that it is possible to make such a centrifugal separation by use of a centrifuge suitable for the starch industry, and which can be operated continuously without clogging.

One suitable type of centrifuge for this purpose is illustrated in Figures 1 to 3 inclusive of the drawing. The machine in this instance consists of a rotor 10 disposed within the housing 11. The body of the rotor is formed of the conical shaped sections 10a and 10b which are held together by the clamp ring 12.

The housing is likewise formed of a plurality of sections, including the main sections 11a and 11b. Upper sections 11c and 11d of the housing are formed to provide the annular chambers 13 and 14, which serve to receive an overflow and an underflow being discharged from the rotor. The main housing sections 11a and 11b are formed to provide the annular volute passage 16, which surrounds the main part of the rotor, and which serves to collect an underflow being discharged from the periphery of the rotor. The chambers 13 and 14 and volute passage 16 are each connected with suitable outlet pipes for withdrawing the separated fractions. As will be presently explained a large part of the material received in the volute 16 is continuously returned back into the rotor.

The lower part 10c of the rotor forms in effect an impeller to facilitate the return of underflow material. Thus within the rotor there is a member 18 which is mounted upon the lower end of the vertical shaft 19. Member 18 carries a conical shaped skirt 20, which is spaced from the adjacent wall portion of the rotor part 10b by radially extending ribs 21. Additional radial extending vanes 22 extend downwardly below member 18, and serve to act upon material which may be discharged upwardly into the impeller, through the lower impeller opening 23. Material discharged outwardly by the vanes 22 and the ribs 21 is discharged into the outer portion 24 of the separating chamber 26.

Below the rotor and mounted upon the housing, there is a nozzle 27, the orifice of which communicates with the liquid space 28 which is formed in the casting 29. Chamber 28 is in communication with a pipe which in turn connects with the volute 16 for return of a large portion of the underflow material.

As previously stated my machine is constructed for two underflow drawoffs, together with a centrifugally separated overflow. One underflow drawoff is from the outer periphery of the separating chamber, and by way of the peripheral discharge nozzles 31. These nozzles are provided with backwardly directed discharge orifices 32. The nozzle construction may be as disclosed and claimed in Patent 2,060,239. The second underflow occurs over the weir 33, and the overflow occurs over weir 34. Weir 33 is formed at the upper end of a sleeve-like extension 36, which is carried by the rotor body part 10a. Weir 34 is formed at the upper end of a sleeve-like extension 37, which is carried by the conical member 38. Conical member 38 is disposed in the upper part of the rotor and immediately above the separating disc assembly 39. It is spaced from the adjacent wall of the rotor body by segmental filler blocks 41, which in turn extend between the radially extending tubes 43. Secondary underflow material flows through the tubes 43, and then upwardly within the sleeve extension 36, to discharge over the weir 33. Before entering the tubes 43 material from the separating chamber must flow past the outer peripheral edge 44 of member 38 and into the annular pocket 46, and thereafter the material enters the relatively restricted passages through the tubes 43. The location of the annular edge 44, the number and size of tubes 43, and the diameter of weir 33 are factors determining the character of the underflow material discharging over the weir 33. The annular space 46 is somewhat isolated from the main separating chamber and serves to transfer the flow of underflow material from the separating chamber to the inlet ends of the tubes 43.

It will be noted that the flow through tubes 43 is radially inward, and is therefore opposed to the centrifugal effects exerted on the material passing therethrough. According to the present invention the number of tubes, their cross-section and the diameter of the weir 33, are made commensurate with the amount of liquor desired to pass therethrough. With the proper proportioning the flow through the tubes is of such velocity as to prevent settling out of solid material therein. More specifically the flow can be sufficiently rapid to prevent separating out of fibrous material by virtue of the centrifugal effect being exerted upon the same. In other words with proper proportioning the fibrous matter congregating in the more or less cylindrical zone about the peripheral edge 44 and entraining in the annular pocket 46, is carried through the tubes 43 with the rapid flow of liquor, and against the centrifugal effects being applied to the same. In this connection it will be noted that according to the present invention, and as illustrated in Figure 1, the middlings are withdrawn from the separating chamber of the rotor in a localized zone where the middlings congregate.

All of the secondary underflow discharged through the tubes 43 passes over the weir 33 into the chamber 14. From this chamber the material can be withdrawn by way of the flanged outlet pipe 14a. Weir 34 discharges into a chamber 13, which is likewise provided with a suitable outlet pipe.

The feed material is introduced through the space between the tubes 47 and 48, which are disposed concentrically about the shaft 19. At the lower ends of these tubes the feed material is received within the member 49, which at its lower end carries a conical skirt 51 underlying the separating discs 39. Radially extending vanes 52 serve to apply rotary velocity to the feed material and to deliver the same outwardly into the separating chamber.

Above the housing suitable bearing means is provided for supporting the shaft and for rotating the same at the desired speed of operation.

Figure 3 diagrammatically illustrates a return circuit for the machine thus described. In this instance a pipe 50 connects to the volute passage 16 and delivers this material into the vent box or flotation cell 55. This box can be divided into the two compartments 53 and 54 which are separated by weir 56. Underflow material which is to be withdrawn from the system can be removed from compartment 53 by way of pipe 57. Wash water can be added by way of pipe 58. An overflow launder 59 is connected by pipe 61 back to the centrifuge rotor. This represents the line which connects with the liquid chamber 28 at the lower end of the centrifuge housing. If desired the vent box 55 can be by-passed by the pipe 62. Lines 63 and 64 of Figure 3 represent the overflow and the second underflow respectively, and line 66 represents the feed material. Use of a vent box in this manner with provision for floating off a floatable fraction of the material being treated, is disclosed in Peltzer, Jr. Patent 2,039,605.

I have discovered that with the use of a machine such as described above, it is possible to make a centrifugal separation upon a starch magma containing starch particles, gluten or similar protein bearing substances, solubles and middlings, whereby the middlings can be withdrawn as a separate centrifugally separated fraction. By protein carrying substances I have reference to substances such as are found in starch bearing vegetables like potatoes. I have more specifically discovered that when operating the machine with such a feed material, it is possible to carry out centrifugal separation with continuous drawoff of a material containing the bulk of the starch as an underflow 16, a material containing the bulk of the middlings as the underflow 64, and material containing the bulk of the gluten and solubles as the overflow 63. I attribute this to the physical makeup of the middlings, which causes them to be collected in a more or less cylindrical region or zone located about the peripheral edge 44, as previously mentioned. I utilize such a separating method to make possible a novel wet starch manufacturing process, wherein the middlings are removed centrifugally and handled separately.

The flow sheet of Figure 4 illustrates one procedure for carrying out my process. Corn is shown being supplied to the conventional steeping operation 81, which is carried out at an elevated temperature of the order of 120° F., and with introduction of sulphur dioxide. Water added for steeping is taken from subsequent steps of the process. At the end of the steeping operation liquor is drained from the corn and is generally sent to evaporators for the manufacture of a valuable by-product. The steeped material is subjected to cracking at 82 to release germs, after which it is treated to germ removal at 83. The germ removal can be carried out according to conventional methods, involving floating off the germs, and washing the germs to remove starch therefrom. The material from operation 83 is subjected to grinding at 84, which is generally carried out by mills of the "Buhr" type. Here the starch grits are ground to sufficient fineness for the subsequent primary separating operation. The material obtained from the grinding operation 84, together with any starch bearing liquid which may be withdrawn directly from operation 83, is then subjected to a series of screening operations for the removal of both fine and coarse slop, as indicated at 85. The magma resulting from the operations described above is commonly referred to in the industry as mill starch, and contains primarily starch particles, gluten, dissolved solids referred to as solubles, and the middlings previously described. It is this material which is subjected to primary separation for the removal of starch from the gluten and solubles. In Figure 4 this mill starch is shown being supplied as a feed to the centrifuge 86. Preferably it is at a Baumé of about 6 to 12 and if it is at a lower Baumé it may be subjected to a dewatering operation prior to supplying it to the centrifuge. Such dewatering can be carried out by gravity settling, by centrifugal settling, or by filtration followed by repulping.

It is assumed that the centrifuge 86 is the same as that illustrated in Figures 1 to 3 inclusive. Line 87 represents the overflow drawoff, line 88 an underflow containing the middlings, line 89 the starch underflow drawoff, and line 91 the return circuit (with or without a vent box) for continuously returning underflow material back into the rotor. The amount of material being returned by way of line 91 will ordinarily be several times the rate of withdrawal by way of line 89. Thus of the total material discharged from nozzles 31, as much as ninety parts or more can be returned by way of line 91, and the remainder withdrawn by line 89. The gluten overflow 87 is shown being treated at 92 for removal of gluten, and the process water thereby obtained is shown being returned to the process by line 93. Gluten removal can be carried out by settling or preferably by filtration.

The secondary underflow 88 is shown being treated at 94 for removal of its fiber, thus providing further wash liquor which is likewise shown being returned to the process by line 95. Line 97 represents introduction of a wash into the return circuit 91 to facilitate displacement of gluten and solubles from the starch carried out in the underflow 89. Line 96 represents removal of starch contaminated fibrous matter from the system. There are various ways in which one may dispose or make use of this fibrous material. For example, in the case of grain and starches, the fibrous matter may be dewatered without further treatment, and the dewatered product processed to form commercial paste. The dewatered material is suitable for such a product because its starch content is relatively high, and its protein content relatively low. If desired only a part of the middling drawoff may be diverted for the manufacture of such a by-product, and the remainder may be returned to the process. The removal of middlings at 94 can be carried out by any suitable method. For example the secondary underflow 88 can be drawn off at a low gravity of say 2 Bé and subjected to fine (e. g. 300 mesh) screening. Also a flotation cell can be employed and operated to withdraw middlings in a foam.

The starch drawoff 89 is shown being further treated at 98 for the purification and removal of the starch. Conventional methods can be used for this operation, including starch filters on which the starch is washed one or more times with fresh water for further removal of colloidal gluten and solubles. The finished starch is then processed according to customary practice. Liquor or effluent 99 derived from operation 98 is likewise available for use back in the process as indicated. In general the returned liquors are routed back into the process in a manner depending upon the degree with which they are contaminated with solubles and gluten. A part of the effluent from operation 98 can be used as the wash 97 in sufficient quantity to cause an upflow toward the secondary underflow discharge, while having a downflow condition in the zone surrounding the separating discs 39.

It will be evident that the process described above provides for the effective removal of middlings whereby the fiber content of the same does not contaminate the finished starch. The removal of middlings in the manner described avoids contamination of the overflow drawoff 87 with such material, thus greatly facilitating the production of high protein gluten from this overflow. A particular feature of the process is that in a single centrifugal separating stage, both conditions of upflow and downflow are maintained. Thus assuming that the amount of wash 97 is in excess of the amount of water withdrawn with the starch in underflow 89, a part of the wash thereby introduced into the centrifuge rotor flows countercurrently from the annular chamber portion 24 to the annular zone 46, to be discharged through the tubes 43. Such countercurrent flow of wash produces what may be termed an upflow condition. Any part of the wash which is introduced into the rotor together with the return circuit, and which does not pass through the tubes 43, is relatively minor compared to the amount of water contained in the feed to the machine. Therefore in that part of the rotor extending inwardly of the peripheral edge 44, downflow conditions can be maintained while maintaining upflow for the outer part of the rotor. The feature just described is radically different from a centrifuge of the Merco type having provision for the discharge of a single underflow, together with an underflow return circuit into which wash liquor is introduced. With such a machine when sufficient wash is introduced into the return circuit to establish upflow conditions, the upflow is maintained throughout the separating chamber, whereby the amount of liquid introduced by way of wash which exceeds the amount of liquid being removed in the underflow drawoff, passes from the machine by way of the overflow.

In place of a single centrifuge stage as in Figure 4 it is desirable for superior grades of starch to use two stages as shown for example in Figure 5. In this instance the two centrifuge stages 101 and 102 are carried out by the use of machines such as previously described, each having provision for two underflow drawoffs. Mill starch is supplied as a feed to centrifuge 101, and this machine is operated whereby the bulk of the gluten passes out in the overflow 103, the bulk of the middlings in the underflow 104, and the bulk of the starch in the underflow 106. Gluten is removed from overflow 103 as indicated at 107, thus providing a liquor for reuse in previous operations of the process. The starch underflow 106 is supplied as a feed to the second centrifuge 102, and this machine is likewise operated in such a manner that gluten is removed in the overflow 108, middlings in the underflow 109, and starch in the underflow 111. The underflow drawoffs 104 and 109 are treated at 112 for removal of middlings. This removed material can be used for the manufacture of various by-products. Liquor recovered from operation 112 can be sent back to operations preceding the centrifuge 101.

The starch underflow 111 is shown being treated at 113 for purification and removal of the starch content. This operation can involve treatment on two or more starch filters, with washing of the filter cake. Wash waters 114 and 116 derived from operation 113, are shown being used respectively as wash in the return circuit 117 of the centrifuge 102, and to make up a wash for introduction into the return circuit 118 of the centrifuge 101. A part of the overflow 108 from machine 102 can be used as wash for machine 101, and also as process liquor back in the process for operations preceding centrifuge 101. That part of the overflow 108 which is sent back to operations preceding machine 101 is relatively free of fiber content, and may or may not be clarified.

It will be evident that in the arrangement of Figure 5 the starch is subjected to two stages of centrifugal separation in order to insure substantially complete removal of gluten, solubles, and middlings. Middlings sent to the operation 112 contain considerable starch as well as fibrous material. In order to prevent a loss to the process the middlings can be treated for starch recovery, and the recovered starch sent back to the process. Such a process is disclosed in Figure 6.

In the flow sheet of Figure 6 operations 81 to 85 inclusive can be the same as described for Figure 4. After slop removal at 85, the gravity of the mill starch may be increased by dewatering, as indicated at 120. The dewatering can be by gravity settling or by filtration followed by repulping. The mill starch at a proper gravity is shown being supplied to the first centrifuge stage 121, which is operated to establish the gluten overflow 122, the underflow drawoffs 123, 124 and the underflow return 126.

The starch underflow drawoff 124 is treated in the second centrifuge stage 127, from which is established the overflow 128, the secondary underflow 129, underflow 130, and underflow return 131. Both centrifuges are operated whereby middlings are separated to pass out in the secondary underflows 123 and 129, and this material is supplied to a secondary steeping operation 132. Steeping serves to facilitate release of fiber from the starch, and is followed by repulping or grinding operation 133 which serves to free starch from associated fiber. In the next operation 134 the fiber content is separated from starch as by screening. It will be understood that treatment can be employed other than steeping to facilitate or make possible a separation between the starch and its associated fiber. Following removal of fiber at 134 the resulting starch bearing liquor is subjected to centrifugal treatment at 135 which can likewise be carried out by the same type of machine as previously described. The fiber-free overflow 136 from centrifuge stage 135 can be sent back to the process for use in preceding stages, and the starch drawoff 137 can be merged with the feed to the machine 121, as indicated. The secondary underflow drawoff 138 contains the fiber and any middlings not removed in the combined operations 132, 133 and 134.

The starch underflow drawoff 130 from stage 127 is subjected to starch purification and removal at 139, which can likewise be carried out by the use of two or more starch filters, with washing of the filter cakes. Filtrates 140 and 141 from operation 139 are shown being used as wash in the process. Thus filtrate 140 is used as a wash for centrifuge stage 127, and filtrate 141 as a wash in the centrifuge stage 121. As indicated by line 142, some additional wash from line 141 can be used in the machine. One part 143 of the overflow 128 from stage 127 can be used in preceding operations as indicated, and another part 144 can be used as a wash in centrifuge stage 135.

The gluten overflow 122 from centrifuge stage 121 is subjected to clarification or gluten removal at 146 to provide further liquor for use back in the process, as for example for steeping at 81.

The process of Figure 6 not only removes middlings from the starch by centrifugal separation, without contaminating the gluten overflow, but in addition treats the middlings in operations 132, 133 and 134, for the recovery of the starch content of the same. Thus the removal of middlings maintains the loss of starch to the middlings within desirable limits.

In the process as illustrated in Figure 7, three centrifuge stages are employed in place of the two stages of Figure 6. The third stage 151 is operated in such a fashion as to discharge middlings in the underflow 152, and this material can be merged with the underflows 123 and 129, from stages 121, 127 respectively, to supply the steeping operation 132. One part 153 of the overflow from stage 151 is shown being used as a wash in the first centrifuge stage 121, and another part 154 is shown being used to dilute the feed to stage 151. The starch underflow 156 from stage 151 is shown being delivered to the starch purification and removal operation 138. The filtrate 139 from this operation is shown being used as a wash in the centrifuge stage 151, and filtrate 141 as a wash in centrifuge stage 127. Here again the fiber-free overflow from centrifuge 127 need not be clarified before using the same back in the process. The overflow from the clean-up centrifuge 135 is shown being used as wash water for the fiber removal operation 134, and as diluting water for the feed to centrifuge stage 127.

Figure 8 illustrates another embodiment and indicates a desirable routing for process liquors. In this instance the cracked corn from operation 82 is subjected to germ separation which involves an initial screening operation 162 to remove finely divided or "grit starch" 163. The germ separation has been indicated as carried out in two stages 161 and 166, involving a cracking operation 164 after the first separating stage, followed by the second germ separating stage 166. Line 167 represents counterflow of germs from the second back to the first stage. After removal of germs the material is ground at 168, and then it is subjected to coarse screening operations 169 for the removal of coarse slop only, with the fine slop fiber being left in the material. This magma is then merged with the grit starch 163 to form a feed to the first centrifuge stage 171. The gluten overflow 172 from stage 171 is treated for gluten removal at 173, thus providing process liquor which can be used in part (174) for steeping at 81 and in part (175) as wash for the germ separating stages 161, 166.

The starch underflow 176 from stage 171 is subjected to screening at 177 for the removal of oversized material, and this oversized material 178 is shown being returned to grinding at 168. After screening for the removal of oversized material, the underflow 176 is supplied as a feed to the second centrifuge stage 179. The starch underflow 181 from stage 179 is supplied to the starch purification and removal operation 182.

The centrifuge stage 171 is operated in such a manner that the bulk of the fine slop is discharged in the underflow 183. In addition to the fine slop this underflow may contain part of the middlings. The remainder of these middlings pass out in the starch underflow 176. Fine slop is removed from the underflow 183 in operation 184, which can be carried out by suitable silk screening operations. The remaining material 186 after removal of fine slop can be returned to merge with the feed to the centrifuge stage 171.

The second centrifuge stage 179 is shown as being carried out by the use of a machine of the Merco type provided with means for withdrawing a single underflow. This machine is operated to obtain good separation between starch passing out in the underflow, and gluten, displaced solubles and middlings in the overflow. The amount of wash introduced in this machine is greater than the amount of water removed in the underflow drawoff 181, to thereby provide an upflow operating condition. A part 187 of the overflow can be used as dilution of the feed to the screen 177. Another part 188 is shown forming a feed to the centrifuge operation 189. Centrifuge operation 189 is preferably carried out by a machine of the type disclosed in Figures 1 to 3 inclusive to provide two underflow drawoffs 190 and 191. The centrifuge is operated to cause middlings to be discharged in the underflow 190. This material is shown passing to the steeping and repulping operations 192, after which the steeped and repulped material is subjected to screening at 193 for the removal of fiber from starch. The remaining material is subjected to centrifuging at 194, which can likewise be carried out by the same type of machine employed for operation 179. The starch underflow 196 from operation 194 is shown merging with the starch underflow 181 from the second centrifuge stage 179. The overflow 197 from operation 194 is shown being used as a wash in the fine slop removal operation 184, and also in screening operation 193. The latter can be carried out by use of a relatively fine mesh screen. The overflow 198 from centrifuge operation 189 is shown being used as a wash in the fine slop removal operation 184.

The effluents 201, 202 and 203, from operation 182, having progressively less contamination, are shown being utilized in the process. Thus effluent 201 is used in part as a wash in centrifuge operation 179, and in part as a wash in centrifuge operation 189. Effluent 202 is shown being used as a wash in the first centrifuge stage 171. Effluent 203 is shown being used as a wash in the clean-up centrifuge 194. It will be noted that fresh water as a wash is introduced into the system by way of operation 182.

The process illustrated in Figure 8 has a number of desirable features. In conventional wet starch manufacturing processes such as previously mentioned, all of the starch passes over silk screens or their equivalents, after being treated in screening operations for the removal of course slop and germs. The fine slop is removed on the silk screens with the use of considerable wash water. The present process differs from such conventional practice particularly in that all of the fine slop passes with the feed into the first centrifuge 171 where it is removed by way of line 183 with only a minor amount of starch. The screening operations employed for the removal of fine slop are therefore greatly facilitated. Another feature of the process illustrated in Figure 8 is the manner in which the overflow from centrifuge 179 is handled. Wet starch manufacturing processes making use of centrifuges of the Merco type for primary separation have employed two Mercos in cascade, with the first Merco operated with substantial downflow, and the second with substantial upflow. The upflow in the second Merco serves to remove middlings and to discharge the same with gluten in the overflow, but this separation occurs together with a substantial amount of starch. The overflow is then concentrated by suitable treatment, and the starch and middlings are returned to the process. Some middlings thus returned to the process eventually reappear in the overflow from the first Merco. However a considerable portion of the middlings are not removed at this point, but pass to the second Merco, where they are discharged with the starch. In other words a runaround occurs which tends to load the system with middlings, with the result that the final starch is contaminated and its quality impaired. In the process of Figure 8 a definite outlet is provided for the middlings by way of the secondary underflow 190 from the centrifuge 189. Because of this definite outlet the runaround of middling carrying starch is reduced to a minimum. The seriousness of a starch runaround in conventional processes making use of two Mercos in cascade, can be better understood when it is pointed out that the runaround middling carrying starch in such processes may in a large manufacturing plant amount to as much as 15% of the total starch undergoing processing.

Figures 9 and 10 illustrate another embodiment of the centrifuge previously described with reference to Figures 1 to 3 inclusive. The machine in this instance has provision for introducing feed material into the lower end of the same, and provision at the upper end of the rotor for introduction of returned underflow material. In this respect the machine is similar to that illustrated in Figure 3 of Peltzer 2,323,077, although in the present instance the machine is provided with means for the withdrawal of two underflows, the same as the machine of Figures 1 to 3. In general the machine of Figures 9 and 10 includes a rotor 211 which is carried by the vertical shaft 212, and which is enclosed within the housing 213. The rotor is provided with peripheral discharge nozzles 214 which have backwardly directed discharge orifices 215. An annular volute 216 is formed as a part of the housing and is disposed to receive material from the discharge nozzles 214.

A conduit 218 communicates tangentially with the volute 216 and connects with an external return circuit whereby underflow is continuously returned back into the centrifuge rotor through the upper passage 219. The starch underflow withdrawn from the centrifuge can be diverted from the return circuit, and wash water can be introduced into the return circuit at a controlled rate.

The rotor is formed of the sections 221a, 221b which are secured together by the clamping ring 222. Another rotor section 221c forming the upper part of the rotor, receives the underflow material discharging downwardly through the passage 219. The interior of the rotor section 221c is provided with the vanes 223, which give rotary velocity to the returned material, and causes this material to be discharged outwardly through the passages 224, and from thence into the outer part 226 of the separating chamber 227.

A structure 228 is mounted upon the lower end of shaft 212, and carries a conical shaped skirt 229, which together with rotor section 221b, defines the passages 224.

For the introduction of feed material a nozzle 241 (Figure 9) extends upwardly into the lower end of the rotor, and connects with the oversize screen fitting 242. The conical shaped member 243 into which the feed material is delivered is provided with radially extending passages 244 for delivering the feed material into the separating chamber 227.

The rotor is also provided with means for discharge of one overflow and two underflows. Thus immediately surrounding member 243, the lower end of the rotor is formed to provide the overflow weir 246. A structure 247 which is mounted upon the lower end of the rotor is formed to provide the annular trough 248, which receives material from the weir 246. An annular member 249 is carried by the lower part of the housing and supports a discharge device 251. This discharge device has an outwardly extending annular portion 252 which is disposed within the trough 248. The discharge device 251 affords a passage 253 which delivers overflow material into the annular space 254, and from thence through passages 256 and 257 to the discharge 258.

Within the lower part of the centrifuge chamber an inverted conical shaped member 259 underlies the separating discs 261 and the space between member 259 and the adjacent wall of the rotor is occupied by the segmental spacing blocks 262, between which are the radially extending tubes 263. The inner ends of the tubes 263 communicate with the downwardly extending tubes 264, which in turn dischage into a trough 266 formed in the structure 247. A discharge device 267 has an outwardly extending annular portion 268 which is disposed within trough 266. The passage 269 in discharge device 267 delivers material into the annular chamber 271, which communicates through the passage valve seat 272 with the passage 274, whereby the secondary underflow material is delivered into the receiver compartment 276. The flow of underflow material through the seat 272 can be regulated by adjusting the position of the valve member 277, which for example can be moved inwardly or outwardly by turning the pinion 278. The regulation must be within the limits determined by the flow through the tubes 263. The two compartments 276 and 258 can connect with pipes (not shown) for withdrawing the underflow and overflow materials.

Both discharge devices 251 and 267 have vanes 250 and 260, the outer ends of which are curved in a direction opposite to the direction of rotation of the rotor whereby such vanes direct material inwardly and through the passages 253 and 269.

Figure 10 schematically illustrates the machine of Figure 9. Line 281 represents the feed of material upwardly into the lower part of the rotor, and line 282 represents the continuous return of underflow material back into the rotor. This return circuit may include a vent box as previously described with reference to Figure 3. A regulated amount of underflow material can be withdrawn as indicated by valve controlled line 283, and a regulated amount of wash can be introduced into the return circuit as indicated by valve controlled line 284. Line 286 represents the withdrawal of centrifugally separated overflow, and line 287 the drawoff of a second underflow, the latter being controlled by adjusting the setting of valve member 288.

By use of the machine illustrated in Figures 9 and 10, one may manually regulate the amount of material drawn off by way of the second underflow, and such regulation can be applied together with regulating the gravity of the return, and the amount of underflow drawoff to adjust the separating conditions and to control the nature of the various separated fractions. By regulating the amount of wash introduced by way of line 284, and at the same time regulating the amount of material in the second underflow drawoff, one can for example maintain an upflow condition at the outer part of the centrifuge chamber, and a downflow condition in that part of the separating chamber extending inwardly from the region where the second underflow is being withdrawn. By upflow I have reference to use of a sufficient amount of wash in the underflow return circuit whereby the amount of wash introduced in this manner is in excess of the amount of water in the withdrawn starch underflow, thus causing a countercurrent flow of wash inwardly of the outer part of the separating chamber. In the region of the intermediate drawoff the upflow wash can be withdrawn leaving separating conditions for the remainder of the separating chamber such that there is no upflow or countercurrent flow of wash, but actually a downflow.

In the process as illustrated in Figure 11, centrifuge separating operations are employed in conjunction with both removal of germs and fiber. Thus in this case the corn is subjected to steeping at 290, and to conventional cracking at 291. The cracked material together with a sufficient amount of liquor to form a feed of proper gravity is supplied to the centrifugal separating operation 292. This separating operation is carried out by the use of a centrifuge such as previously described, with the discharge passages and ports being of sufficient size to avoid clogging. The overflow 293 contains centrifugally separated gluten and solubles, and is shown being subjected to gluten removal at 294, to produce a liquor 296 which can be used for steeping 290. The separating conditions are controlled whereby germs pass out in the underflow 297, and this underflow is shown being subjected to screening at 298 for germ removal. One part 299 of the material remaining after the germs are removed is shown being returned to the process ahead of the centrifuge operation 292. Another part 301 can be supplied to a subsequent operation to be presently described. The starch underflow 302 from the operation 292 is shown subjected to further cracking at 303, thereby forming a feed for the second centrifugal separating operation 304. The overflow 306 from operation 304 contains gluten and solubles, and can be used as a wash in the germ screening operations 298. The intermediate underflow 307 contains germs not removed in operation 292, and can be passed to the screening operation 298.

The starch underflow 308 from operation 304 is shown being subjected to screening at 309, for removal of oversized material, and the remaining material is then supplied as a feed to the centrifugal separating operation 310. Oversized material removed at 309 is shown being subjected to grinding 311 as by means of a Buhr mill, and the ground material is then subjected to coarse screening at 312 for the removal of coarse slop. The starch bearing magma thereby obtained is likewise supplied to the operation 310, together with the material from screening operation 309. The separating operation 310 is controlled in such a manner that some of the fine slop and the aforementioned middlings pass out in the underflow 313, and the remainder of the fine slop present caused to pass out with the starch in the underflow 314. The overflow 316 contains mainly gluten and solubles, and is used in preceding operations as will be presently described. Thus one part 317 of this overflow can be used as a wash in the screening operation 312, and another part 318 employed as a wash in the return circuit for centrifugal separating operation 292.

The intermediate underflow drawoff 313 is shown being subjected to steeping and repulping 321, followed by fine screening 322 or other means of separation for the removal of fiber from starch particles. The remaining starch bearing magma thereby obtained is supplied as a feed to the centrifugal separating operation 323. The overflow 324 from this operation can be used in part as a wash in the screening operation 322, and the starch underflow 326 can be merged with the feed to the operation 310, and the remainder can be used in a preceding stage of the process. The intermediate underflow drawoff 325 contains fiber centrifugally separated from the material, and can be diverted from the system for further treatment. Fresh wash water 327, or water from one of the subsequent operations, can be supplied to the return circuit of operation 323.

The starch underflow 314 from operation 310 is subjected to fine screening at 328 for the removal of fine slop, thus providing a starch bearing magma for use as a feed in the centrifugal separating operation 329. This operation is controlled in such a manner that any residual middlings are discharge in the intermediate underflow drawoff 331. Note that this drawoff is merged with the drawoff 313 from operation 310, for supplying the steeping operation 321.

The overflow 332 from operation 329 contains largely residual gluten and solubles, and a part 333 of this overflow can be used as wash in the screening operation 328, and another part 334 as wash in the return circuit for the operation 304. The starch underflow 336 from operation 329 is supplied to the first one of the two starch filtering operations 337 and 338. The filtrate 339 from operation 337 can be used in part (341) as a wash in the return circuit for operation 329, and in part (342) as wash in the return circuit for the operation 310. Filtrate 343 from the second starch filtering operation 338 can be used as a wash in the operation 329. Note that wash water is being supplied to both filtering operations 337 and 338.

It will be evident that the process illustrated in Figure 11 greatly simplifies conventional germ and slop separating operations such as are now carried out in conventional wet starch processes. The conventional germ flotation operation is omitted, and germs removed by the use of centrifugal separation in conjunction with simple screening. The fiber separating operations are carried out in such a manner that the screening systems required are greatly simplified. So-called middlings are removed and separately treated to recover the starch content of the same, whereby the fiber content of the final starch product is relatively low.

The centrifuge illustrated in Figures 12 and 13 is likewise suitable for use in the present process, and is particularly adapted for machines of the larger sizes. This machine consists of a rotor 344 which is attached to the vertical drive shaft 345, and is enclosed in the housing 346. The rotor can be made of two conical shaped sections 344a, 344b, which are secured together by the lock ring 347. The sleeves 348, 349 are disposed concentrically about the shaft 345, and serve to form a passage 350 for introducing feed material. The sleeve 349 is surrounded by the downwardly divergent sleeve 351 which forms a part of the rotor, and which directs the feed material downwardly and outwardly through the passage 352 and annular orifice 353. Radially extending vanes 354 and 355 in the passage 352 impart rotary motion to the feed material before it is discharged through orifice 353, into the main centrifuge chamber 356.

The separating discs 357 are spaced outwardly from the sleeve member 351, thus providing space for the overflow discharge device 358 and the second underflow discharge device 359. These devices can be somewhat similar to the discharge devices 268 and 252 of Figure 9, and are formed to provide divergent diffuser passages 361 and 362.

The upper surface of the separating chamber 356 is defined by a conical shaped member 363, which extends over the discs 357, and which is provided with an inner depending rim or flange 364. This flange forms a baffle extending downwardly and about the entrant end of the discharge device 358. A plurality of circumferentially spaced and radially extending vanes 366 are disposed in the space below the discharge device 358, and surrounded by the separating discs 357. Intermediate the discharge devices 358, 359, there is a conical shaped dividing wall 367, which is likewise carried by member 363. In operation the outer peripheral portion of discharge device 358 is immersed in overflow material and overflow is caught up by this discharge device and delivered inwardly and upwardly into the annular chamber 368, from which it can be removed through a suitable valve controlled pipe. The partition member 367 operates within a closed recess 369 formed between the discharge devices 358, 359, and can be provided with vanes 371, 372, upon its upper and lower faces.

Immediately above the member 363, a series of circumferentially spaced and radially extending tubes 373 are provided, and these tubes are circumferentially spaced by suitable filler blocks. The outer ends of the tubes 373 communicate with an annular zone 374, which corresponds to the zone 46 of Figure 1. The inner ends of the tubes 373 deliver material to the annular space 376, from which it is removed by the discharge device 359. Underflow material delivered inwardly and upwardly through the discharge device 359 is received in the annular chamber 377, from which it can be removed through a suitable valve controlled pipe.

The primary underflow occurs through the nozzles 378, which are mounted upon the periphery of the centrifuge rotor. This discharge passes through the annular throat 379, and is received in the annular volute 381. From this volute the bulk of the material is delivered through a return circuit back into the centrifuge rotor, while a part of the underflow is withdrawn. The return circuit includes the nozzle 382 through which the underflow material is delivered upwardly into the lower end of the centrifuge rotor. By virtue of impeller means formed in the lower end of the rotor, such returned material is delivered outwardly and introduced into the outer portion of the separating chamber 356. The impeller means includes the inclined vanes 383 which extend upwardly from the mounting ring 384, together with the radially extending vanes 385, 386, 387 and 388. The vanes 387, 388 are within a passage 389 formed between the rotor section 344b, and the inner liner member 391. At the outer periphery of the liner member 391 there is an annular orifice 392 through which all of the underflow material passes to merge with the material in the separating chamber.

A particular feature of the centrifuge illustrated in Figures 12 and 13 is that it makes possible use of separating discs of relatively large outside and inside diameters, and such as are desirable for centrifuges of the larger sizes. A further feature is that the overflow is removed by a discharge device operating within a zone which is generally surrounded by a portion of the discs. In general the discharge arrangement for both the overflow and the second underflow, greatly facilitates the control of these fractions, while at the same time enabling relatively sharp separation between the various components of the feed.

In some instances the centrifuge of Figures 12 and 13 can be advantageously used to facilitate the removal of relatively heavy solids such as may occasionally be associated with starch slurries. I have particular reference to such solids as sand or like solid impurities which tend to be present in starch slurries derived from potato culls. Also in the processing of cassava roots in the manufacture of tapioca starch, the cortical outer skin or layer breaks up into fine fragments when the roots are ground, and these fragments cannot be satisfactorily removed by fine screens of the order of 400 mesh. Also some corn and sorghum starch slurries may contain undesired solids which are heavier than the starch. By proper operation of the discharge valves from volutes 381, 377, and 368, the bulk of the starch can be drawn off by way of the intermediate underflow discharge from volute 377, while another fraction can be withdrawn through the underflow nozzles 378 which contains sand or the fragments of the cortical layer or other heavier solids, together with some of the starch of the feed. The heavier material can be drawn off from time to time as this material tends to accumulate in the underflow circuit. Also an underflow circuit containing material like sand or other heavier material can be passed through suitable supplemental separating means capable of removing the same. The drawoff established from the underflow circuit can be processed for the recovery of its starch content, or if desired it can be separately processed to provide an inferior grade of starch.

Assuming the handling of starch slurries of the type described above, containing sand, fragments of cortical skin, or other heavier material, it is possible to utilize two stage centrifugal treatment, the first stage being adjusted whereby the bulk of the starch is discharged into volute 381. The drawoff from the underflow circuit is then sent as a feed to the second centrifuge, which can be adjusted for drawoff of starch by way of volute 377, with the heavier material (e. g. sand, etc.) being in the underflow withdrawn from volute 381. Likewise it is possible to operate the two centrifuge stages with the first stage being adjusted for drawing off the bulk of the starch (free of sand, etc.) from volute 377, and with this material then being sent to the second stage for further centrifugal treatment.

In operating the machine of Figures 12 and 13, the underflow circuit may be heated to an undesirable elevated temperature due to continuous recirculation. In such event suitable heat exchange means can be provided for cooling the return circuit and to thereby avoid development of excessive temperatures.

Reference is made to my application Serial No. 267,941 filed April 14, 1939, now abandoned, which in part disclosed subject matter disclosed and claimed herein.

I claim:

1. In a wet starch process wherein a magma is produced containing starch, gluten and fibrous material associated with starch particles, the improvement comprising subjecting said magma to centrifugal separation whereby the bulk of the starch is withdrawn in an underflow, the bulk of the gluten and solubles withdrawn in an overflow and said fibrous material withdrawn in a second intermediate underflow, subjecting the material of said last mentioned underflow to steeping, removing fiber from the steeped material, and returning starch thereby recovered back into the process.

2. In a wet starch process wherein a magma is produced containing starch, gluten and fibrous material associated with starch particles, subjecting said magma to centrifugal separation whereby starch is withdrawn in an underflow, separated gluten and solubles withdrawn in an overflow and said fibrous material withdrawn in an intermediate underflow, subjecting said material of said intermediate underflow to steeping, removing fiber from the steeped material by screening, subjecting the remaining magma to centrifugal separation whereby starch is withdrawn in an underflow, and returning said last named starch underflow back into the process.

3. In a wet starch process wherein a magma is produced containing starch, gluten and fibrous material associated with starch particles, the improvement comprising subjecting said magma to a first stage of centrifugal treatment whereby the bulk of the starch is withdrawn in an underflow, the bulk of the gluten and solubles removed in an overflow and said fibrous material and starch associated with the same withdrawn in an intermediate underflow, subjecting said starch underflow drawoff to a second stage of centrifugal separation whereby starch is withdrawn in an underflow, remaining gluten and solubles withdrawn in an overflow and a substantial part of the fiber and starch associated with the same withdrawn in an intermediate underflow utilizing the overflow, from said second stage centrifugal treatment as wash in steps of the process preceding subjecting the first named underflow from said second stage to treatment for purification and removal of the starch.

4. In a wet starch process wherein a magma is produced containing starch, gluten and fibrous material associated with starch particles, the improvement comprising subjecting said magma to a first stage of centrifugal treatment whereby starch is withdrawn in an underflow, gluten and solubles removed in an overflow and said fibrous material and starch associated with the same withdrawn in an intermediate underflow, subjecting said starch underflow drawoff to a second stage of centrifugal separation whereby starch is withdrawn in an underflow, remaining gluten and solubles withdrawn in an overflow and a substantial part of the fiber and starch associated with the same withdrawn in an intermediate underflow, utilizing the overflow from said second stage centrifugal treatment as wash in steps of the process preceding said first stage centrifugal separation, subjecting the intermediate drawoffs from the first and second stages of centrifugal separation to steeping, screening the stepped material for removal of fiber therefrom, and then returning the starch of the remaining magma to the process.

5. In a wet starch process wherein a magma is produced containing starch, gluten and fibrous material associated with starch particles, the improvement comprising subjecting said magma to a first stage of centrifugal treatment whereby starch is withdrawn in an underflow, gluten and solubles removed in an overflow and said fibrous material and starch associated with the same withdrawn in an intermediate underflow, subjecting said starch underflow drawoff to a second stage of centrifugal separation whereby starch is withdrawn in an underflow, remaining gluten and solubles withdrawn in an overflow, and a substantial part of the fiber and starch associated with the same withdrawn in an intermediate underflow, utilizing the overflow from said last stage centrifugal treatment as wash in steps of the process preceding said first stage centrifugal separation, subjecting the intermediate drawoffs from the first and second centrifugal stages to steeping, screening the steeped material for the removal of fiber therefrom, subjecting the resulting magma to centrifugal separation for the removal of starch in an underflow, separated gluten and solubles in an overflow and fiber in an intermediate underflow, and returning said last named starch underflow to the process for merging with the feed to the first stage of centrifugal separation.

6. In a wet starch process wherein a magma is produced containing starch, gluten and fibrous material associated with starch particles, subjecting said magma to centrifugal separation whereby the bulk of the starch is withdrawn in an underflow, separated gluten and solubles withdrawn in an overflow and the bulk of said fibrous material withdrawn in an intermediate underflow, subjecting the material of said intermediate underflow to steeping, removing fiber from the steeped material by screening, subjecting the remaining magma to treatment for separation of starch therefrom, and returning said starch back into the process.

7. A new wet starch process wherein a magma is produced containing starch, gluten and fibrous material associated with starch particles, the improvement comprising subjecting said magma to a first stage of centrifugal treatment whereby starch is withdrawn in an underflow, gluten and solubles removed in an overflow, and the bulk of said fibrous material and starch associated with the same withdrawn in an intermediate underflow, subjecting said starch underflow drawoff to a second stage of centrifugal separation whereby starch is withdrawn in an underflow, remaining gluten and solubles withdrawn in an overflow, and a substantial amount of fiber and starch associated with the same withdrawn in an intermediate underflow, utilizing the overflow from said last stage centrifugal treatment as wash in steps of the process preceding said first stage centrifugal separation, subjecting the intermediate drawoffs from the first and second centrifugal stages to treatment for the removal of fiber therefrom, and subjecting the resulting magma to centrifugal separation for the removal of starch in an underflow.

8. In a wet starch process wherein a magma is produced containing starch, gluten and fibrous material associated with starch particles, the improvement comprising subjecting said magma to centrifugal separation by continuously feeding said material to a rotating body of the same, continuously withdrawing a centrifugally separated overflow containing the bulk of the gluten and solubles from the inner portion of the body, continuously withdrawing a first underflow containing the bulk of the starch from the outer peripheral portion of the body, continuously withdrawing a second underflow containing said fibrous material and starch particles associated therewith from a portion of the body intermediate said inner portion and said outer peripheral portion, and then subjecting said first underflow to treatment in the absence of said fibrous material for purification and removal of the starch.

References Cited in the file of this patent

UNITED STATES PATENTS

| | | |
|---|---|---|
| 545,128 | Moffatt | Aug. 27, 1895 |
| 643,323 | Duryea | Feb. 13, 1900 |
| 757,778 | Schrader | Apr. 19, 1904 |
| 1,974,679 | Lindberg | Sept. 25, 1934 |
| 2,286,355 | Fitzsimmons | June 16, 1942 |
| 2,316,807 | Peltzer | Apr. 20, 1943 |
| 2,321,918 | Jones | June 15, 1943 |
| 2,323,077 | Peltzer | June 29, 1943 |
| 2,488,747 | Strezynski | Nov. 22, 1949 |